United States Patent [19]

Swanberg

[11] Patent Number: 5,704,263
[45] Date of Patent: Jan. 6, 1998

[54] SAW GUIDE APPARATUS AND METHOD

[76] Inventor: Edward William Swanberg, 7124 Weld County Rd. 17, Ft. Lupton, Colo. 80621

[21] Appl. No.: 498,999

[22] Filed: Jul. 6, 1995

[51] Int. Cl.$^6$ ........................................ B27B 9/04
[52] U.S. Cl. .................. 83/13; 83/56; 83/745; 83/581; 33/429; 33/640
[58] Field of Search ................... 33/427, 429, 464, 33/479, 474, 41.1, 41.4, 42, 44, 562, 640; 83/745, 581, 13, 56

[56] References Cited

U.S. PATENT DOCUMENTS

| | | | |
|---|---|---|---|
| 1,262,971 | 4/1918 | Olson | 33/429 |
| 2,371,485 | 3/1945 | Waldman | 33/429 |
| 2,536,378 | 1/1951 | Lee | 33/427 |
| 2,579,857 | 12/1951 | Premo | 33/565 |
| 4,028,976 | 6/1977 | Kundikoff . | |
| 4,054,077 | 10/1977 | Gram . | |
| 4,056,028 | 11/1977 | Patterson . | |
| 4,109,901 | 8/1978 | Akin . | |
| 4,112,987 | 9/1978 | Pachnik | 83/745 |
| 4,138,914 | 2/1979 | Reeder . | |
| 4,202,233 | 5/1980 | Larson . | |
| 4,235,022 | 11/1980 | Fernandez Aldape | 33/42 |
| 4,335,512 | 6/1982 | Sheps et al. . | |
| 4,513,510 | 4/1985 | Swanson | 33/427 |
| 4,530,156 | 7/1985 | Kettlestrings | 33/562 |
| 4,608,761 | 9/1986 | Small . | |
| 4,651,607 | 3/1987 | Camp | 83/745 |
| 5,148,730 | 9/1992 | McCaw . | |
| 5,170,568 | 12/1992 | Wright | 33/429 |
| 5,182,975 | 2/1993 | Warner | 83/745 |

FOREIGN PATENT DOCUMENTS 900089   9/1944   France ........................ 33/429

*Primary Examiner*—Eugenia Jones
*Assistant Examiner*—Charles Goodman
*Attorney, Agent, or Firm*—Rick Martin

[57] ABSTRACT

A saw guide is provided for use with a hand held circular power saw thereby enabling a user to selectively cut either a 90 or 45 degree cut through a construction member such as a 2×4. The saw guide is adapted to be used with either a 2×4, 2×6, 2×8, 2×10, or a 2×12. The saw guide has a first saw guide edge, a second saw guide edge and a wood guide edge. The saw guide also has two adjustable pencil guide edges which are internal to the saw guide. The pencil guide edges are situated so that they are parallel to the first and second saw guide edges. The pencil guide edges are movably mounted within the saw guide so that they can be adjusted so to the width of a given power saw's foot. This allows the user to automatically account for this foot width when using the saw guide to cut a desired length of construction member. The saw guide also is designed to allow the user to easily clamp it to a board. Thus, the user does not have to use one hand to keep the saw guide in place. Both the user's hands leave free to control the board and the saw.

21 Claims, 8 Drawing Sheets

SAW GUIDE APPARATUS AND METHOD

BACKGROUND OF THE INVENTION

1. Field of the Invention

This invention relates to the field of carpenter's tools, and more specifically to a light weight hand tool that is usable to guide a portable and electrically powered hand saw as the saw is used to cut a piece of construction or building material.

2. Description of the Related Art

A number of saw guides usable to guide a powered saw are known in the art.

U.S. Pat. Nos. 4,054,077, 4,056,028, 4,608,761 and 5,226,345 all provide for the guiding of a power hand saw, but suffer from the deficiency of having extending guide members that make it difficult to store the saw guide in a tool pouch, and in addition, these devices have extending guide members that are easily hit or cut by the saw's rotating blade.

U.S. Pat. No. 5,148,730 provides a hinged flap that moves out of the way when the saw guide is used. However, this device is complex and again suffers from having extending members that make it difficult to store the saw guide in a tool pouch.

Other complex multi-part devices are exemplified by U.S. Pat. Nos. 4,028,976, 4,109,901, 4,138,914, 4,202,233 and 4,335,512.

While prior saw guides, as generally described above, have been somewhat useful for their limited intended purposes, the need remains in the art for a saw guide of a simple, minimum part, no moving part, construction that has no extending members, which saw guide is usable without the need for the carpenter to bend down and view the saw blade, with the result that dust generally flies in the carpenter's face and eyes, wherein the saw guide does not include saw guide projections, and the like, that are subject to bumping or cutting, thereby resulting in an out-of-adjustment saw guide, and wherein there is no need to modify the saw's foot member, nor attach one or more auxiliary devices to the saw's foot member, thereby resulting in a foot member of a special and nonconventional construction.

SUMMARY OF THE INVENTION

This invention provides a carpenter's tool in the form of a light weight saw guide that is usable to guide a portable, electrically powered, hand held, circular saw, as the saw is used to cut a piece of construction material. In a nonlimiting sense to the spirit and scope of this invention, exemplary construction or building materials to be cut include wood 2×2s, 2×4s, 2×6s, 2×8s, 2×10s and 2×12s, 1-inch thick wood pieces of this size group, aluminum siding and vinyl siding.

The saw guide of this invention is usable with a well known and conventional power hand saw having a circular saw blade that spins in a vertical plane that is offset a given distance from, and extends parallel to, one of the two linear edges of a horizontally extending foot member. In saws of this general type, it is usual that the saw blade can be adjusted to cut as deep as 2½-inches beyond the plane of the foot member. In a preferred embodiment of the invention, the saw guide includes a T-shaped wall. While the height of this wall is not critical to the invention, in an embodiment of the invention, this wall height was selected such that the saw could be adjusted to about a 1⅞-inch depth cut.

The saw guide of this invention is usable to selectively saw a 90-degree cut, or an angled cut, such as a 45-degree cut. While the invention is not to be limited thereto, the invention will be described relative to sawing the well-known wood members 2×4, 2×6 and 2×8.

A saw guide in accordance with the invention is a rigid, unitary, and planar member that is shaped as a right triangle; preferably, an isosceles right triangle. The three triangle sides of the saw guide comprise a 90-degree saw guide edge, a wood guide edge that meets the 90-degree saw guide edge at a right angle and is adapted to physically engage the side of a wool member to be cut, and an angled saw guide edge, this latter edge preferably comprising, but without limitation thereto, a 45-degree saw guide edge.

The unique 90-degree triangle configuration of a saw guide in accordance with the invention also facilitates its use by a carpenter to check the accuracy of 90-degree structural elements, for example, door jams, thus rendering the saw guide of this invention useful as a conventional square.

Two manually-adjustable marker guides, or pointers, pencil guides, or surfaces, are provided within the triangular body of the saw guide. A first of these marker surfaces is a 90-degree marker guide, or pointer, that is movably mounted within the body of the saw guide, and has a guide surface that extends parallel to the 90-degree saw guide edge. This first marker surface extends parallel to the 90-degree saw guide edge, and is located the above-mentioned saw blade distance from the saw guide's 90-degree saw guide edge. The second marker pointer or surface extends parallel to the angled saw guide edge, and is also positioned the above-mentioned saw blade distance from the angled saw guide edge.

It is important to note that once these two marker surfaces or pointers are set, as above described for a given saw, they are clamped to the body of the saw guide, and they remain accurately adjusted for future use of the saw guide with that given saw. Since these two marker surfaces or pointers are located internal of the saw guide body, they are both protected from blows that might disturb the positions of the marker surfaces.

As a feature of the invention, a saw guide of the invention that is of a size adapted to be used in cutting 2-inch, 4-inch or 6-inch members includes three linear arrays of nail holes that are used to releasably clamp the saw guide to a wood member to be cut. These linear arrays of nail holes are adapted to be used with a standard size nail (for example, a 16 penny nail) to allow the carpenter to drop a nail into a selected hole, whereupon the carpenter presses down on the saw guide, thereby causing the saw guide to be clamped, or trapped, onto the wood member by the wood member interference that exists between the nail and the saw guide's T-shaped wood guide edge.

More specifically, a first linear array of nail holes is formed within, and perpendicular to, the triangular body of the saw guide, this first nail hole array being formed at an angle to the wood guide edge and at a first distance from the wood guide edge, such that at least one of these first nail holes aligns with a first edge of a 4-inch wide wood member whose second edge engages the wood guide edge. A second linear array of nail holes is formed within, and perpendicular to, the triangular body of the saw guide, this second nail hole array being formed at an angle to the wood guide edge, and at a greater distance from the wood guide edge, such that at least one of these second nail holes aligns with a first edge of a 6-inch wide wood member whose second edge engages the wood guide edge. A third linear array of nail holes is formed within, and perpendicular to, the triangular body of the saw guide, this third nail hole array being formed at an angle to the wood guide edge, and at a yet greater distance from the wood guide edge, such that at least one of these third nail holes aligns with a first edge of an 8-inch wide wood member whose second edge engages the wood guide edge.

When the saw guide of the invention is physically enlarged to provide for the additional sawing of 2×10s and 2×12s, then two additional linear arrays of nails holes are provided, the fourth linear array of nail holes being formed within, and perpendicular to, the triangular body of the saw guide, this fourth nail hole array being formed at an angle to the wood guide edge, and at an even greater distance from the wood guide edge, such that at least one of these fourth nail holes aligns with a first edge of a 10-inch wide wood member whose second edge engages the wood guide edge, and the fifth linear array of nail holes being formed within, and perpendicular to, the triangular body of the saw guide, this fifth nail hole array being formed at an angle to the wood guide edge and at the greatest distance from the wood guide edge, such that at least one of these fifth nail holes aligns with a first edge of a 12 inch wide wood member whose second edge engages the wood guide edge.

An important characteristic of the invention resides in the fact that the saw guide has no projecting parts. Thus, a saw guide of the invention that is sized relative to 2-inch, 4-inch and 6-inch construction material easily fits within a carrier, such as the carpenter's conventional tool pouch. Thus, the saw guide is unlikely to become dislodge from the tool pouch as the carpenter climbs a ladder, and the like.

As a further feature of the invention, the dimensions of the saw guide facilitate easy manual insertion of the saw guide into a standard size carpenter's tool pouch, these preferred dimensions being about ⅛-inch thick, with the 90-degree saw guide edge and the angled saw guide edge both being about 10¼-inches long, and with the wood guide edge being about 14⅝-inches long. Said wood guide edge having arms extending substantially perpendicular from the top and bottom surfaces of the saw guide. The arms have a rectangular cross section and extend along the length of the wood guide edge. The arms have a thickness of about ⅜ of an inch and they extend about ⅝ of an inch beyond the top and bottom surfaces. While the above measurements define a portable saw guide that is very useful, a larger size saw guide in accordance with the invention (for example, one that would be used to saw 10 and 12 inch members) is also very useful (for example, at a sawing station or at a bench).

While the material from which the saw guide is made is not critical to the invention, the material selected should be economical and should be physically adequate for the saw guide's desired performance, and as yet another feature of the invention, the saw guide, including the saw guide's two pencil marker assemblies, is made from the material group plastic, brass, aluminum, and an aluminum alloy.

A method of using the above-described saw guide and a power hand saw that has a circular saw blade offset a given distance from an edge of a foot member to selectively saw a 90-degree cut, or a 45-degree cut through a wood member, comprises the steps of providing a first mark on the wood member at the location of a desired 90-degree or 45-degree saw cut, positioning the saw guide with its wood guide edge on one linear and vertical surface of the wood member, positioning the 90-degree saw guide edge or the 45-degree saw guide edge coincident with this first mark, with the saw guide in this position providing a second mark on the wood member coincident with the saw guide's 90-degree marker surface, or 45-degree marker surface, thereafter moving the saw guide to an operative position so as to place its 90-degree saw guide edge, or its 45-degree saw guide edge coincident with this second mark, and using the hand saw to saw a 90-degree cut or a 45-degree cut through the wood member as the edge of the saw's foot member is guided by the 90-degree saw guide edge or the 45-degree saw guide edge.

While the saw guide of the invention can be easily hand-held in its operative position due to the large surface area of the saw guide that then rests on the wood member, as a feature of the invention, a clamping means is used to clamp the saw guide to the wood member in the saw guide's operative position.

As will be apparent to those of skill in the art, use of a saw guide in accordance with the invention insures that straight cuts will be made by users of only average skill in the carpenter arts, increases user productivity, saves the valuable time of a user, and the saw guide is equally usable to cut both long and short wood members.

As will be apparent, the symmetrical top/bottom surface and arm construction and arrangement of a saw guide in accordance with the invention adapts the saw guide for easy of use by either a right-handed or a left-handed carpenter.

These and other objects, features and advantages of the invention will be apparent to those of skill in the art upon reference to the following detailed description of the invention, which description makes reference to the drawing.

DESCRIPTION OF THE PREFERRED EMBODIMENTS

The present invention provides a carpenter's tool, and more specifically, a light weight saw guide that is usable to guide a portable and electrically powered circular hand saw, as the saw is used to cut a wood member; for example, and without limitation thereto, to cut a wood 2×4, a wood 2×6 or a wood 2×8.

Figure 1:
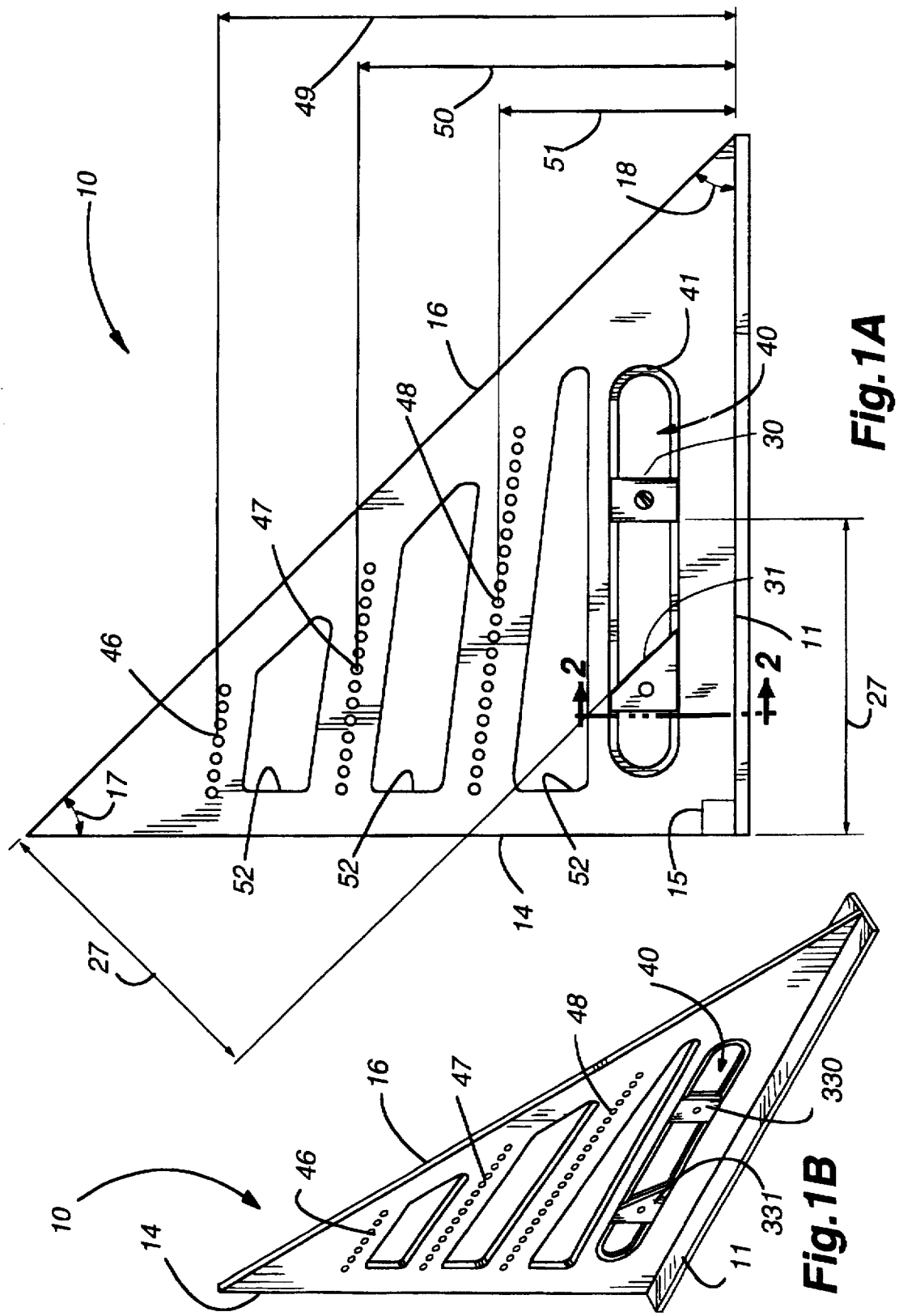
FIG. 1, consisting of FIGS. 1A and 1B, shows a plan view of a 90-degree isosceles triangle saw guide in accordance with the invention, the opposite-side plan view of the saw guide being a mirror image of FIG. 1.

FIG. 1 is a plan view of a 90-degree isosceles triangle saw guide 10 in accordance with the invention, the opposite-side plan view of the saw guide being a mirror image of FIG. 1. As will be apparent, saw guide 10 is selectively usable to saw either a 90-degree cut or 45-degree cut (more broadly, an angled cut) through or into a wood member; for example, a 2×4, a 2×6 or a 2×8.

Figure 2:
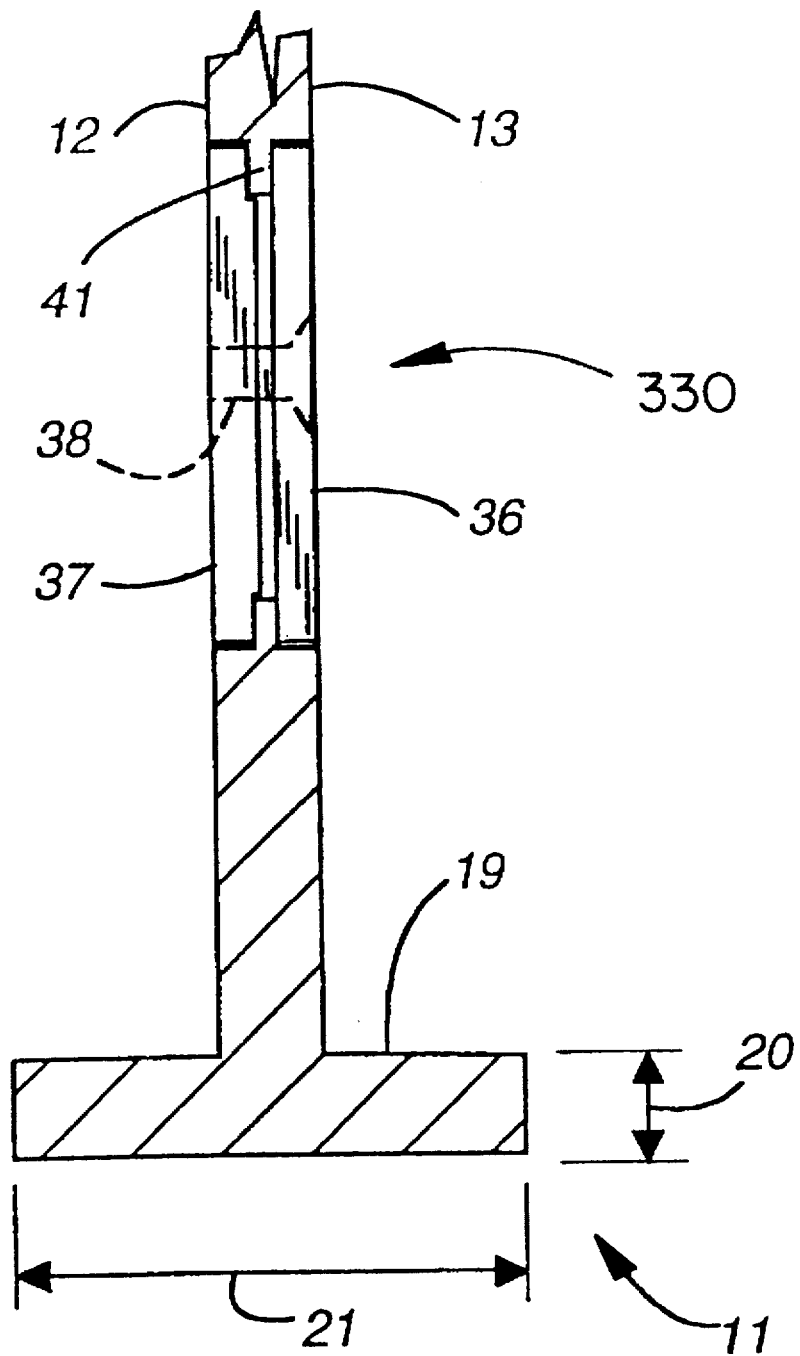
FIG. 2 is a partial section view of the saw guide of FIG. 1 taken along the section line 2—2 of FIG. 1, showing the saw guide's wood guide edge, and showing the construction of one of the two pencil guide assemblies.

FIG. 2 is a partial section view of saw guide 10 taken along the section line 2—2 of FIG. 1. FIG. 2 shows the saw guide's wood guide edge 11 and the saw guide's first and second generally parallel and flat planar surfaces 12,13 that are spaced a given distance apart, this distance being about ⅛-inch in an embodiment of the invention.

Saw guide 10 comprises a unitary, rigid, and planar member that is shaped as a right triangle having a 90-degree saw guide edge 14, wood guide edge 11 that meets 90-degree saw guide edge 14 at right angle 15, and is adapted to physically engage a linear side of a wood member to be cut, and an angled or 45-degree saw guide edge 16.

In an embodiment of the invention, angles 17,18 were both 45-degree angles, saw guide surfaces 12,13 are spaced about ⅛-inches apart, 90-degree saw guide edge 14 and wood guide edge 11 are both about 10¼-inches long, and 45-degree saw guide edge 16 was about 14⅝-inches long. With reference to FIG. 2, in this embodiment of the invention, wood guide edge 11 is formed from arms 19. Arms 19 have a rectangular cross section with a thickness 20 of about ⅛ inch and a length 21 of about 1 inch. Said arms extend generally perpendicularly from surfaces 12, 13 about ⅝ of an inch. The resulting wood guide edge has a T-shaped profile as seen in FIG. 2.

Figure 3:
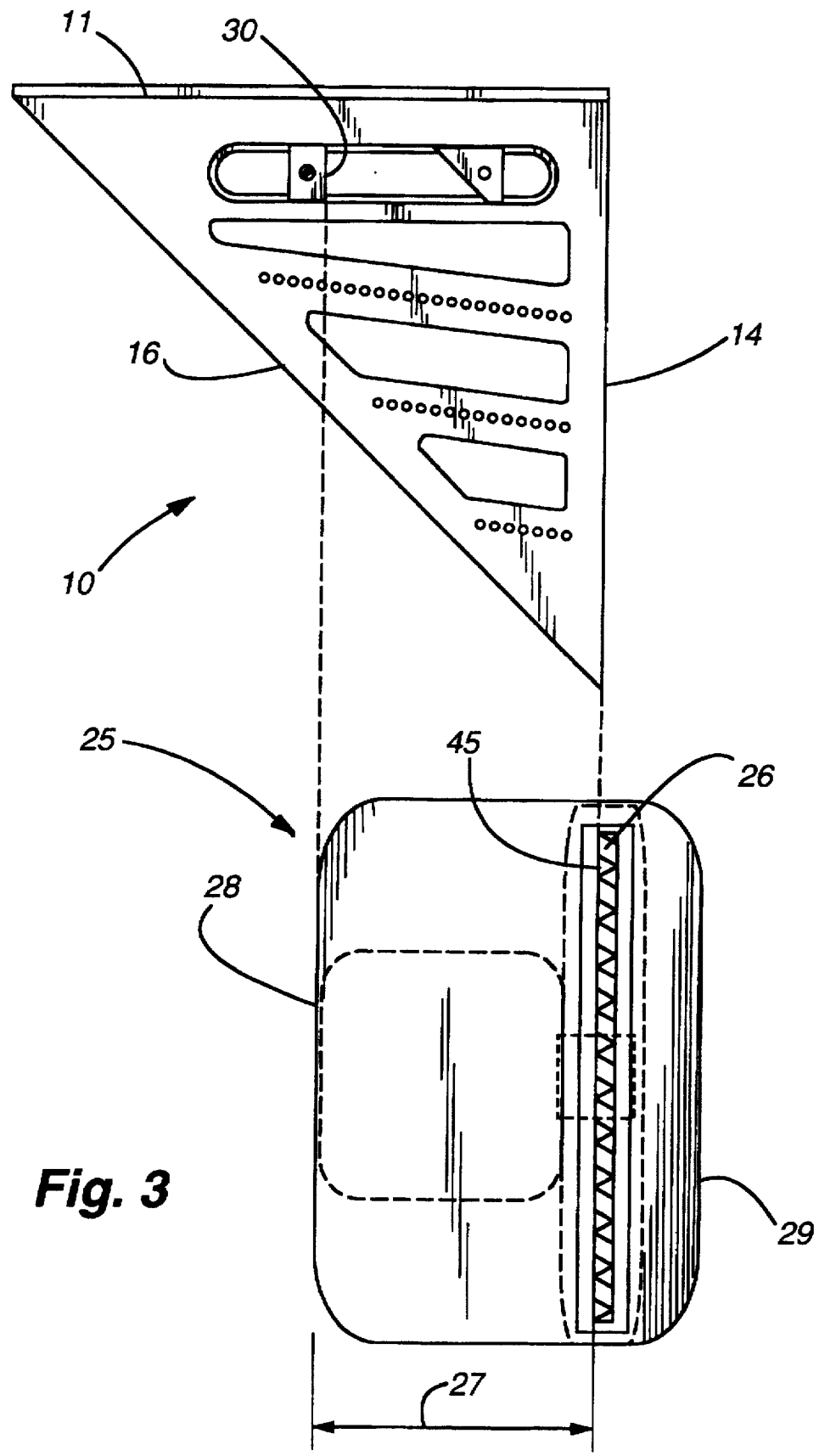
FIG. 3 shows the saw guide of FIG. 1 in positional association with the bottom of a conventional power hand saw, this figure showing the manner of adjusting the saw guide's 90-degree pencil index surface in accordance with a saw blade position parameter.
Figure 4:
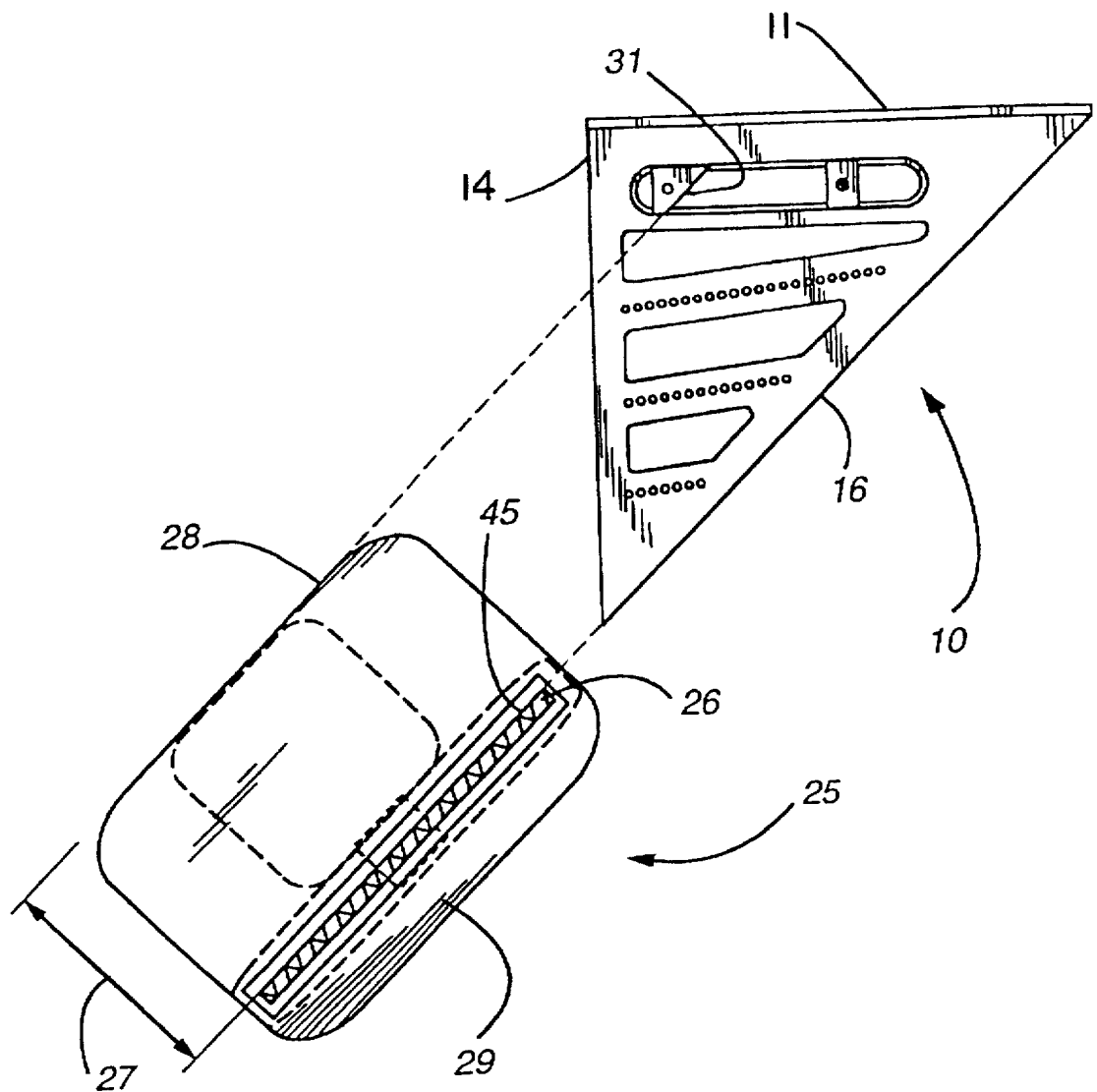
FIG. 4 is a view similar to FIG. 3, and shows the saw guide of FIG. 1 in positional association with the bottom of the power hand saw of FIG. 3, this figure showing the manner of adjusting the saw guide's 45-degree pencil index surface in accordance with the saw's blade position parameter.

Saw guide 10 is manually operable and is intended for use with a power hand saw having a circular saw blade that is offset a given distance from the linear edge of a foot member. With reference to FIGS. 3 and 4, a simplified bottom view of a hand saw 25 is shown, wherein circular saw blade 26 extends perpendicular to a foot member 29, and is offset a given distance ($d_1$) 27 from the linear edge 28 of foot member 29.

As shown in FIG. 1, saw guide 10 includes two pencil or marker guide surfaces 30,31. Pencil guide surface 30 is a 90-degree pencil guide that is formed by a structural assembly 330 that is movably mounted within the triangular confines of saw guide 10. Pencil guide surface 30 extends perpendicular to surfaces 12,13, parallel to 90-degree saw guide edge 14, and pencil guide surface 30 is positioned saw blade distance 27 from 90-degree saw guide edge 14. Pencil guide surface 31 is a 45-degree pencil guide that is formed by a structural assembly 331 that is also movably mounted within the triangular confines of saw guide 10. Pencil guide surface 31 extends perpendicular to surfaces 12,13, parallel to 45-degree saw guide edge 16, and pencil guide surface 31 is positioned saw blade distance 27 from 45-degree saw guide edge 16.

As a feature of the invention, pencil guide surfaces 30,31 are formed with a three-piece structural assemblies 330, 331 respectively that are constructed and arranged so as to not extend beyond surfaces 12,13. This feature of the invention can best be seen in FIG. 2, wherein the construction and arrangement of one of these structural assemblies 330 is shown. Saw guide 10 is provided with a slot 40 that is about ⅞-inch wide (measured parallel to surfaces 11,12) and extends parallel to wood registration edge 11. Slot 40 is provided with a recessed ridge 41 that encircles slot 40. A first plate 36 and a second plate 37 are fastened together by the use of a bolt 38. In this manner, the two pencil guide surface structural assembly 330, 331, each comprising three members 36, 37 and 38, have outer surfaces that are flush with, or are extensions of, saw guide surfaces 12,13.

FIGS. 3 and 4 show how pencil guide surfaces 30,31 are manually adjusted to provide a saw guide 10 that is matched to the dimensions of a powered hand or circular saw 25. For simplicity in these figures, saw guide 10 is shown spaced a short distance from saw 25. In FIG. 3, saw guide edge 14 is moved into engagement with the left side 45 of saw blade 26, and pencil guide surface 30 is moved to coincidence with the edge 28 of the saw's foot member 29. Bolt 38 of that pencil guide is then tightened. In FIG. 4, saw guide edge 16 is moved into engagement with the left side 45 of saw blade 26, and pencil guide surface 31 is moved to coincidence with the edge 28 of the saw's foot member 29. Bolt 38 of that pencil guide 330,331 or structural assemblies 330 or 331 is then tightened.

As a feature of the invention, a means is provided to clamp saw guide 10 to the wood member being cut. In an embodiment of the invention wherein saw guide 10 was adapted to selectively cut a 2×4, a 2×6, or a 2×8, this clamping means comprises three linear arrays 46,47,48 of nail holes that penetrated through surfaces 12,13. These three nail hole arrays extended parallel to each other and extended at a noncritical angle to wood registration edge 11. The generally middle hole in the array of holes 46 was located a distance 49 about 7 ¼-inch from wood guide edge 11, such that at least one of the first holes 49 would align with a first 2-inch edge of a 2×8 whose second 2-inch edge engaged wood guide edge 11. The generally middle hole in the array of holes 47 was located a distance 50 about 5½-inch from wood guide edge 11, such that at least one of the second holes 50 would align with a first 2-inch edge of a 2×6 whose second 2-inch edge engaged wood guide edge 11. The generally middle hole in the array of holes 48 was located a distance 51 about 3½-inches from wood guide edge 11, such that at least one of the third holes 50 would align with a first 2-inch edge of a 2×4 whose second 2-inch edge engaged wood guide edge 11.

Figure 5:
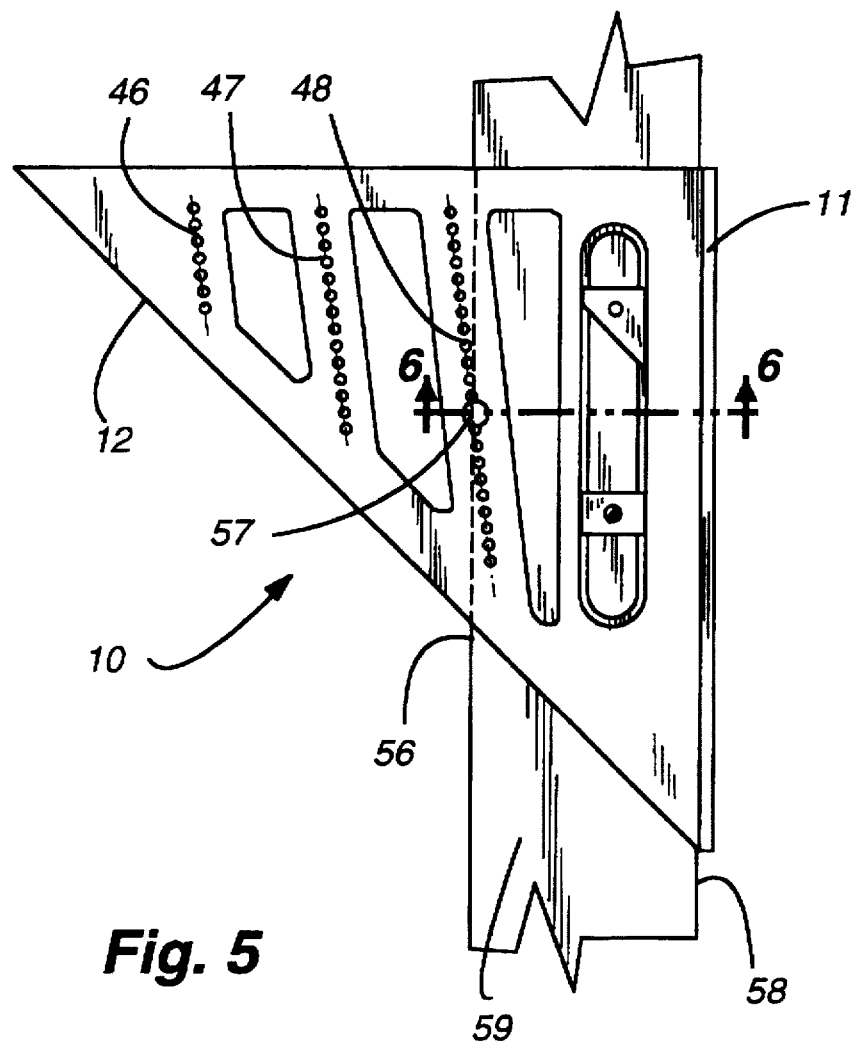
FIG. 5 shows the manner of selecting one of the saw guide's nail holes for the insertion of a 16 penny nail relative to 2×4 that is to be cut using the saw guide of FIG. 1.
Figure 6:
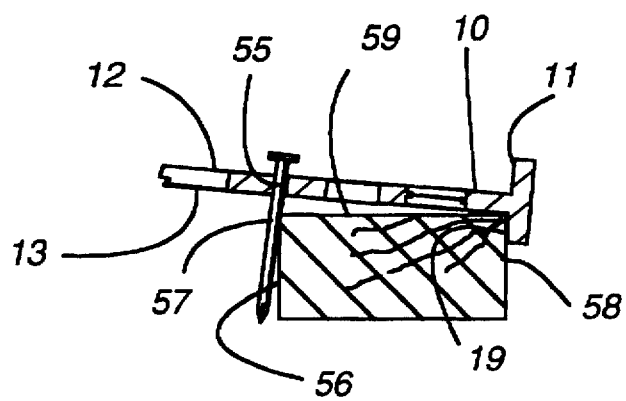
FIG. 6 shows the manner of releasably clamping the saw guide of FIG. 1 to the 2×4 of FIG. 5 by use of a 16 penny nail that has been inserted into the hole that was selected in FIG. 5.

FIG. 5 shows the manner of selecting one of the saw guide's nail holes from hole array 48 for the insertion of a 16 penny nail relative to 2×4 that is to be cut using saw guide 10. As can be seen in FIG. 5, when saw guide 10 is positioned with its wood guide edge 11 against one of the 2-inch sides 58 of the 2×4 (see FIG. 6 but with saw guide 10 laying flat), the saw guide lays flat against the 4 inch side 59 and the other 2-inch side 56 of the 2×4 can be viewed as extending generally through the center of a hole 55 in array 48. In this manner, hole 55 of array 48 is selected for use in the manner of FIG. 6, wherein saw guide 10 is releasably clamped to the 2×4 by use of a 16 penny nail 57 that has been inserted into hole 55 that was selected in FIG. 5, saw guide 10 then being pressed down so that its surface 13 engages the 4-inch surface 59 of the 2×4.

As a feature of the invention, slot-like through holes, indicated by lines 52, may be provided to reduce the weight of saw guide 10. Since the provisions of such slot-like through holes result in the use of less material, such as aluminum, when making the saw guide, the presence of these through holes also results in a somewhat lower manufacturing cost. Saw guide 10 and its pencil guide assemblies are preferably formed from the material group plastic, brass, aluminum, and an aluminum alloy.

Figure 14:
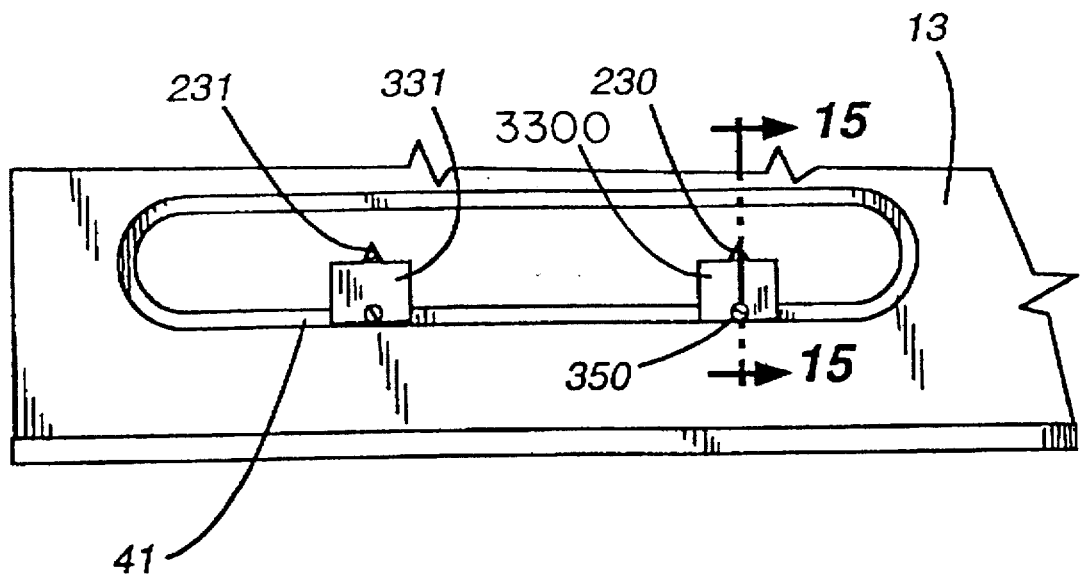
FIGS. 14 and 15 show an alternate construction of one of the two pencil guide assemblies.
Figure 15:
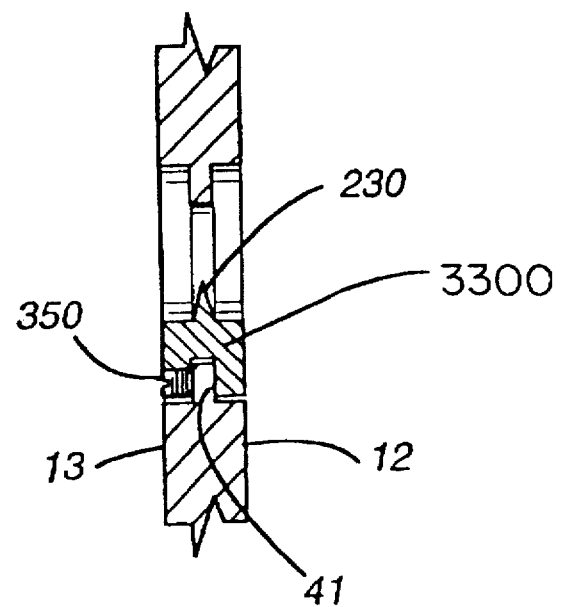

FIGS. 14 and 15 show an alternate construction of one of the two pencil guide assemblies. In this arrangement through slot 40 and its encircling internal ridge 41 support two movable and setable pointer assemblies 3300 and 3310 that respectively contain pencil guides or pointers 230 and 231. Pointers 230,231 are functionally the equivalent of surfaces 30 and 31 of FIG. 1. As can be seen in FIG. 15, each of the two pointer assemblies 3300,3310, is movably attached to ridge 41 by the use of a releasable set screw 350.

Figure 7:
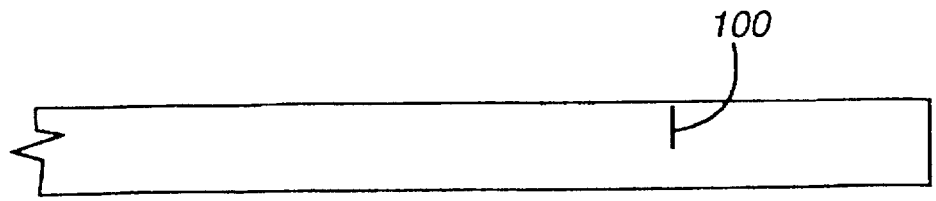
FIGS. 7–10 show a method of using the saw guide of FIG. 1 to saw a 90-degree cut in a 2×4.
Figure 8:
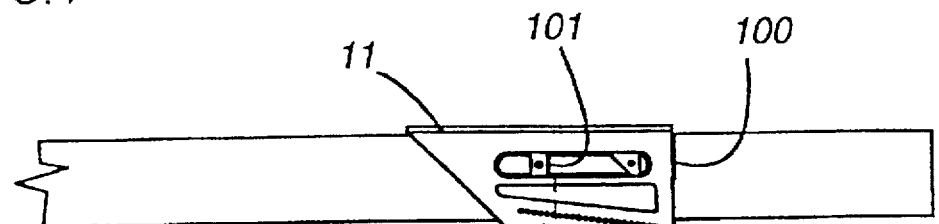
Figure 9:
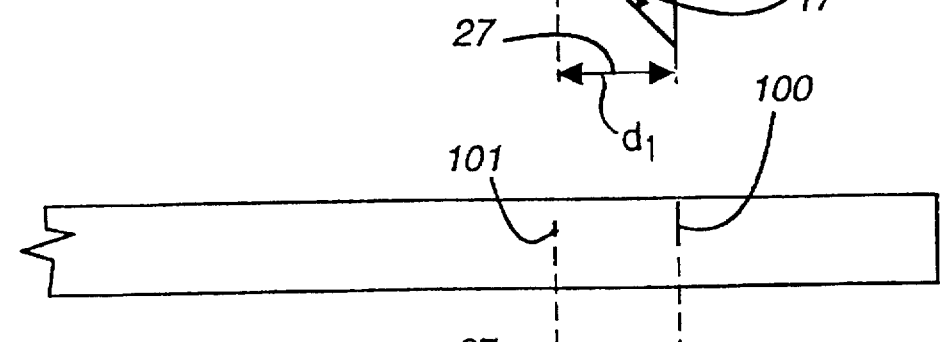
Figure 10:
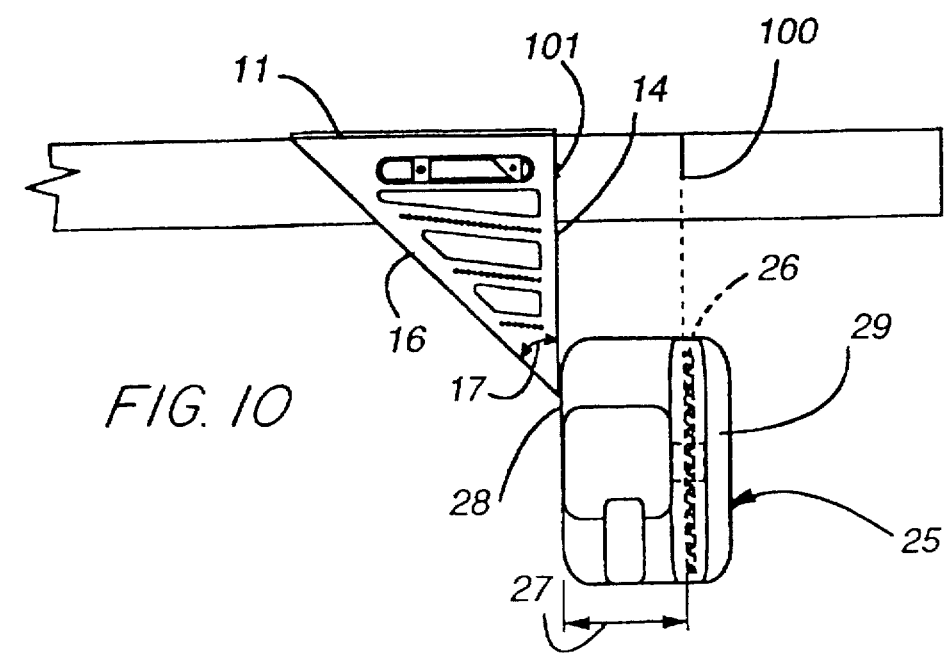

FIGS. 7-10 show a method of using saw guide 10 and electrically powered circular hand saw 25 to saw a 90-degree cut in a 2×4. FIG. 7 shows the 2×4 marked with a first pencil mark 100 that identifies the location of a desired 90-degree cut. In FIG. 8, saw guide 10 has been manually positioned with its 90-degree saw guide edge 14 coincident with first pencil mark 100. In this FIG. 8 position of saw guide 10, a second pencil mark 101 is now placed on the 2×4, using pencil guide surface 30 shown in FIG. 1. FIG. 9 shows the 2×4 with its two pencil marks 100,101 that are separated by the saw distance 27. Saw guide 10 is now moved to its FIG. 10 position where 90-degree saw guide edge 14 is coincident with the second pencil mark 101.

FIG. 9 is the operating position of saw guide 10 whereat saw 29 is used to saw a 90-degree cut in the 2×4 coincident with first pencil mark 100, as the saw's foot member edge 28 freely slides along 90-degree saw guide edge 14. As will be appreciated, saw guide 10 can be hand-held in this FIG. 10 position, or one of a variety of well-known clamping means may be used to hold saw guide 10 in this position, or one of the holes in hole array 48 and a 16 penny nail can be used, as above described.

Figure 11:
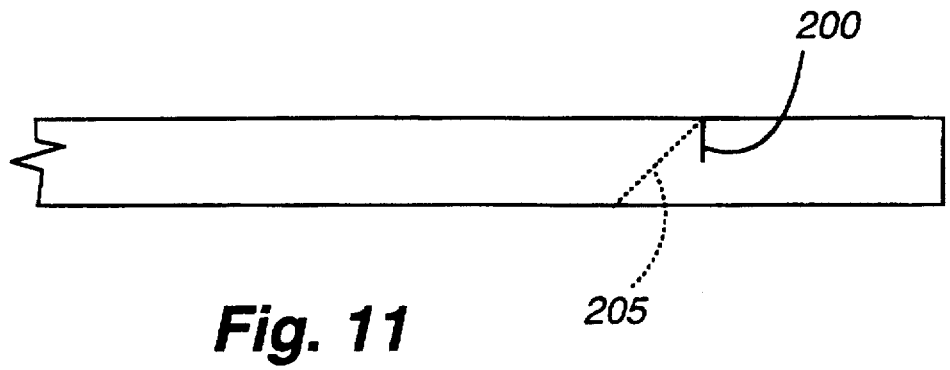
FIGS. 11–13 show a method of using the saw guide of FIG. 1 to saw a 45 degree cut in a 2×4.
Figure 12:
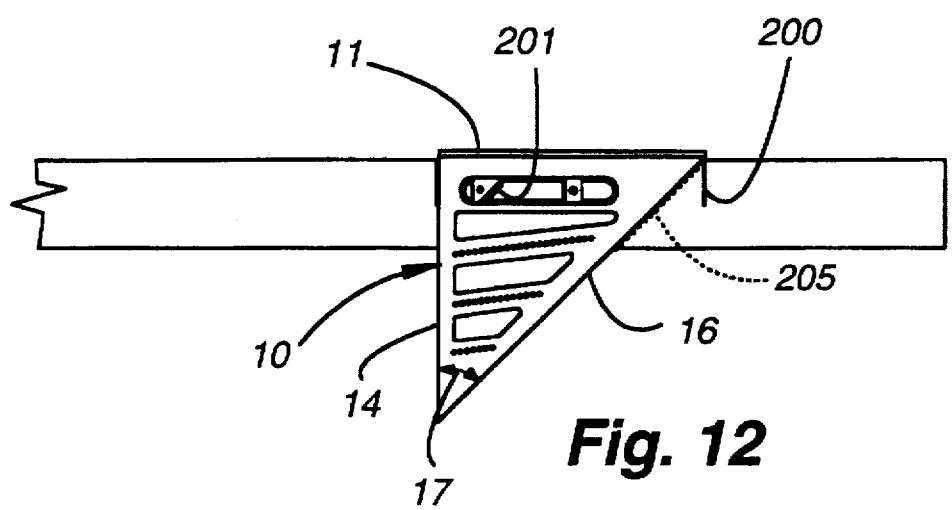
Figure 13:
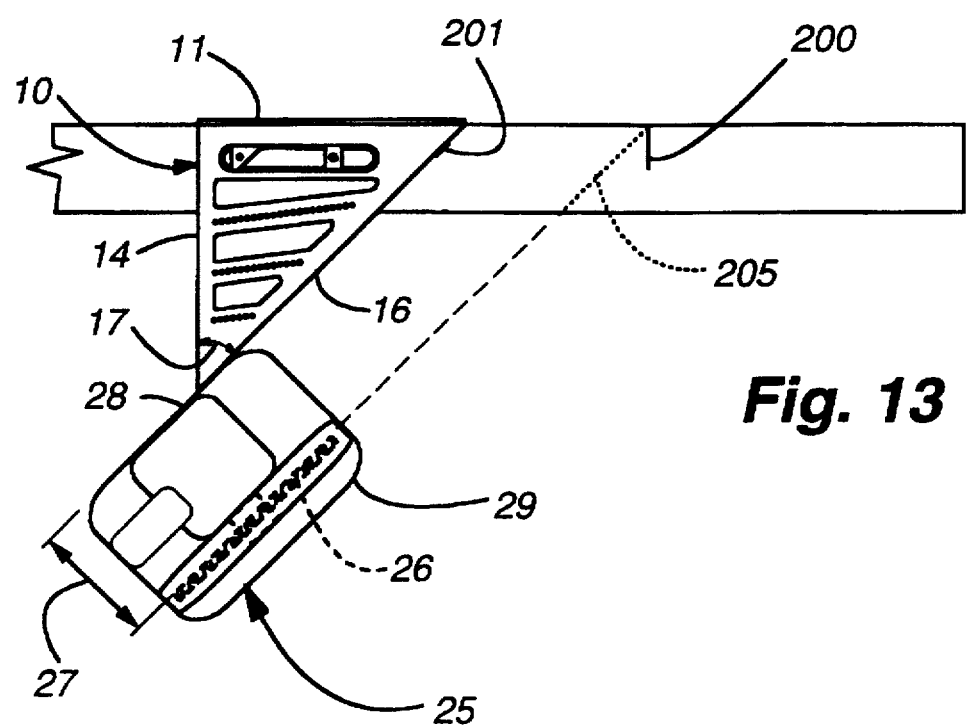

FIGS. 11-13 show a method of using saw guide 10 and electrically powered circular saw 25 to saw a 45-degree cut in a 2×4. FIG. 11 shows the 2×4 marked with a first pencil mark 200 that identifies the location of the desired 45-degree cut 205. In FIG. 12, saw guide 10 has been manually positioned with its 45-degree saw guide edge 16 coincident with first pencil mark 200. In this FIG. 12 position of saw guide 10, a second pencil mark 201 is now placed on the 2×4, using pencil guide surface 31 shown in FIG. 1. Saw guide 10 is now moved to its FIG. 13 position where 45-degree saw guide edge 16 is coincident with this second pencil mark 201.

FIG. 13 is the operating position of saw guide 10 whereat saw 29 is used to saw a 45-degree cut 205 in the 2×4 coincident with first pencil mark 200, as the saw's foot member edge 28 freely slides along 45-degree saw guide edge 16. As will be appreciated, saw guide 10 can be hand-held in this FIG. 13 position, or one of a variety of clamping means may be used to hold saw guide 10 in this position, or one of the holes in hole array 48 and a 16 penny nail can be used as above described.

Note that in the methods of using saw guide 10 of the invention, in both of the above-described instances of a 90-degree and a 45-degree cut the point 17 of the saw guide (see FIG. 1) where 90-degree saw guide edge 14 and 45-degree saw guide edge 16 meet is directed toward hand saw 25. In this way, saw guide 10 operates to guide edge 28 of the saw's foot member 29 before saw blade 26 actually engages the 2×4 that is to be cut. As will be appreciated, this construction and arrangement facilitates accurate cutting of the 2×4.

The present invention has been described in detail while making reference to preferred embodiments thereof. However, since it is recognized that those skilled in the art will, upon learning of this invention, readily visualize yet other embodiments that are within the spirit and scope of this invention, this detailed description is not to be interpreted as a limitation on the spirit and scope of the invention.

What is claimed is:

1. A method of using a power hand saw having a circular saw blade that is offset a given distance from an edge of a foot member to selectively saw a 90-degree cut in a construction member, comprising the steps of:

providing a saw guide that is shaped as a right triangle, said saw guide having (1) a 90-degree saw guide edge, (2) a wood guide having arms which form a T-shape on the guide, said wood guide edge meeting said 90-degree saw guide edge at a right angle and is adapted to physically engage a side of a construction member to be cut, (3) an angled saw guide edge, (4) a movable 90-degree marker surface that is mounted within said right triangle, extends parallel to said 90-degree saw guide edge, and is adjustable so as to position said 90-degree marker surface said given saw blade distance from said 90-degree saw guide edge, and (5) an angled marker surface that is mounted within said right triangle, extends parallel to said angled saw guide edge, and is adjustable so as to position said angled marker surface said given saw blade distance from said angled saw guide edge;

adjusting the 90-degree marker surface parallel to the 90-degree saw guide edge so that said 90-degree marker surface is said given saw blade distance from the 90-degree saw guide edge;

providing a first mark on said construction member to identify a desired location of a desired cut;

positioning said saw guide at a first position with said wood guide edge on one side surface of said construction member, and with the 90-degree saw guide edge coincident with said first mark, providing a second mark on said construction member coincident with the 90-degree marker surface parallel to the 90-degree saw guide;

moving said saw guide to a second position with said wood guide edge on one side surface of said construction member, and with said 90-degree saw guide edge coincident with said second mark; and using said hand saw to saw the desired cut in said construction member as said edge of said foot member is guided by said 90-degree saw guide edge.

2. The method of claim 1, including the steps of:

providing a clamping means to clamp said saw guide to said construction member with said saw guide in said second position.

3. A method of using a power hand saw having a circular saw blade that is offset a given distance from an edge of a foot member to selectively saw an angled cut in a construction member, comprising the steps of:

providing a saw guide that is shaped as a right triangle, said saw guide having (1) a 90-degree saw guide edge, (2) a wood guide having arms which form a T-shape on the guide, said wood guide edge meeting said 90-degree saw guide edge at a right angle and is adapted to physically engage a side of a construction member to be cut, (3) an angled saw guide edge, (4) a movable 90-degree marker surface that is mounted within said right triangle, extends parallel to said 90-degree saw guide edge, and is adjustable so as to position said 90-degree marker surface said given saw blade distance from said 90-degree saw guide edge, and (5) an angled marker surface that is mounted within said right triangle, extends parallel to said angled saw guide edge, and is adjustable so as to position said marker surface said given saw blade distance from said angled saw guide edge;

adjusting the angled marker surface parallel to the angled saw guide edge so that said angled marker surface is said given saw blade distance from the angled saw guide edge;

providing a first mark on said construction member to identify a desired location of a desired cut;

positioning said saw guide at a first position with said wood guide edge on one side surface of said construction member, and with the angled saw guide edge coincident with said first mark, providing a second mark on said construction member coincident with the angled marker surface parallel to the angled saw guide;

moving said saw guide to a second position with said wood guide edge on one side surface of said construction member, and angled saw guide edge coincident with said second mark; and using said hand saw to saw the angled cut in said construction member as said edge of said foot member is guided by said angled saw guide edge.

4. The method of claim 3, including the steps of:

providing a clamping means to clamp said saw guide to said construction member with said saw guide in the second position.

5. A saw guide comprising:

a unitary rigid member shaped in the form of a right triangle having first and second generally parallel and flat planar surfaces that are spaced a first given distance apart;

said member having a first saw guide edge extending generally perpendicular to said first and second surfaces;

said member having a wood guide edge extending generally perpendicular to said first and second surfaces, said wood guide edge having a length;

said first saw guide edge and said wood guide edge meeting to form a right angle;

said member having a second saw guide edge extending generally perpendicular to said first and second surfaces and meeting said first saw guide edge and said wood guide edge so as to form a triangle therewith;

said wood guide edge having arms extending generally perpendicular from said first and second surfaces along the length of said wood guide edge;

a first manually adjustable marker guide movably mounted within said member;

said first marker guide having a 90-degree marker surface that extends generally parallel to said first saw guide edge and generally perpendicular to said first and second surfaces;

said first marker guide being constructed and arranged so as to not extend beyond said first and second planar surfaces;

said 90-degree marker surface being adapted to be positioned a second given distance from said first saw guide edge as measured generally parallel to said first and second surfaces; and a second manually adjustable marker guide movably mounted within said member;

said second marker guide having a second marker surface that extends generally parallel to said second saw guide edge and generally perpendicular to said first and second surfaces; and said second marker surface being adapted to be positioned said second given distance from said second saw guide edge as measured generally parallel to said first and second surfaces.

6. The saw guide of claim 5, wherein:

said first given distance is about ⅜ inch;

said first saw guide edge is about 10¼0 inch long;

said wood guide edge is about 10¼ inch long; and said arms extending about ⅝ of an inch beyond the first and second surfaces; and said second saw guide edge is about 14⅝ inch long.

7. The saw guide of claim 6, wherein said arms are about ⅛-inch thick.

8. The saw guide of claim 7, wherein said member is made from a material selected from the material group consisting of plastic, brass, aluminum, and an aluminum alloy.

9. The saw guide of claim 8, wherein said first and second marker guides are made from a material selected from the material group consisting of plastic, brass, aluminum, and an aluminum alloy.

10. A manually operable saw guide for use with a power hand saw to selectively saw either a 90-degree cut or a 45-degree cut through a construction material member selected from the group consisting of 2×4, 2×6 and 2×8, the hand saw having a planar and rectangular foot member through which a circular saw blade extends generally perpendicular to the plane of the foot member, the saw blade being positioned parallel to one edge of the foot member and being spaced a given distance from said one edge, the saw guide comprising:

a unitary and rigid member shaped in the form of a right triangle having first and second generally parallel, flat, and triangular shaped surfaces;

said member having a 90-degree saw guide edge extending generally perpendicular between said first and second surfaces;

said member having a wood guide edge;

said wood guide edge having arms extending generally perpendicular between and extending beyond said first and second surfaces and adapted to physically engage one 2-inch side of the construction material member;

said 90-degree saw guide edge and said wood guide edge meeting to form a substantially right angle;

said member having a 45-degree saw guide edge extending generally perpendicular between said first and second surfaces and meeting said 90-degree saw guide edge and said wood guide edge so as to form a 45-degree right triangle therewith;

a 90-degree manually-adjustable marker guide movably mounted in said member;

said 90-degree marker guide having a marker surface that extends generally parallel to said 90-degree saw guide edge and generally perpendicular to said first and second surfaces;

said 90-degree marker guide being constructed and arranged so as to not extend beyond said first and second surfaces;

said 90-degree marker guide being adapted to position said marker surface said given saw distance from said 90-degree saw guide edge; and a 45-degree manually-adjustable marker guide movably mounted in said member;

said 45-degree marker guide having a 45-degree marker surface that extends generally parallel to said 45-degree saw guide edge and generally perpendicular to said first and second surfaces;

said 45-degree marker guide being constructed and arranged so as to not extend beyond said first and second surfaces; and said 45-degree marker guide being adapted to position said 45 degree marker surface said given saw distance from said 45-degree saw guide edge.

11. The saw guide of claim 10 further comprising:

a first linear array of nail holes formed in said member, said first array of nail holes being formed at an angle to said wood guide edge and at about 3½ inches from said wood guide edge such that at least one of said first array of nail holes is adapted to be aligned with a 2-inch edge of a 2×4 whose opposing 2-inch edge engages said wood guide edge, thereby enabling a nail to be placed through a hole in said first array and functionally engage said 2×4;

a second linear array of nail holes formed in said member, said second array of nail holes being formed at an angle to said wood guide edge and at about 5½ inches from said wood guide edge such that at least one of said second array of nail holes is adapted to be aligned with a 2-inch edge of a 2×6 whose opposing 2-inch edge engages said wood guide edge, thereby enabling a nail to be placed through a hole in said second array and functionally engage said 2×6; and a third linear array of nail holes formed in said member, said third array of nail holes being formed at an angle to said wood guide edge and at about 7¼ inches from said wood guide edge such that at least one of said third array of nail holes is adapted to be aligned with a 2-inch edge of a 2×8 whose opposing 2-inch edge engages said wood guide edge, thereby enabling a nail to be placed through a hole in said third array and functionally engage said 2×8.

12. The saw guide of claim 11, wherein:

said first and second surfaces are spaced about ⅛-inch apart;

said 90-degree saw guide edge is about 10¼-inch long;

said wood guide edge is about 10¼ inch long;

said arms having a length extending beyond said first and second surface about ⅝-inch; and said 45-degree saw guide edge is about 14⅝-inch long.

13. The saw guide of claim 12, wherein said arms are about ⅛ inch thick.

14. The saw guide of claim 13, wherein said member is made from a material selected from the material group consisting of plastic, brass aluminum, and an aluminum alloy.

15. The saw guide of claim 14, wherein said two marker guides made from a material selected from the material group plastic, brass, aluminum, and aluminum alloy.

16. A manually operable saw guide for use with a power hand saw having a circular saw blade that is offset a given distance from and is parallel to a linear edge of a foot member, the saw guide being usable to selectively saw either a 90-degree cut or an angled cut through sawable materials, the saw guide comprising:

a rigid and planar member shaped as a right triangle;

said member having a 90-degree saw guide edge;

said member having a wood guide edge that meets said 90-degree saw guide edge at a right angle;

said wood guide edge having arms that extend generally perpendicular from said member and is adapted to physically engage a linear side of a 4-inch wide sawable material, a linear side of a 6-inch wide sawable material, or a linear side of an 8-inch wide sawable material;

said member having an angled saw guide edge;

said member having a 90-degree manually adjustable pencil guide movably mounted in said member and having a first pencil guide surface that extends parallel to said 90-degree saw guide edge and is positioned said given saw blade distance from said 90-degree saw guide edge; and said member having an angled manually adjustable pencil guide movably mounted in said member and having a second pencil guide surface that extends parallel to said angled saw guide edge and is positioned said given saw blade distance from said angled saw guide edge.

17. The saw guide of claim 16, wherein said sawable material is selected from the group consisting of 2×4, 2×6, and 2×8, said saw guide further comprising:

a first linear array of holes formed in said member, said first hole array being formed at an angle to said wood guide edge such that at least one of said first holes aligns with a first edge of a 2×4 whose second 2-inch edge engages said wood guide edge;

a second linear array of holes formed in said member, said second hole array being formed at an angle to said wood guide edge and at a second distance from said wood guide edge such that at least one of said second nail holes aligns with a first 2-inch edge of a 2×6 whose second 2-inch edge engages said wood guide edge; and a third linear array of holes formed in said member, said third hole array being formed at an angle to said wood guide edge and a third distance from said wood guide edge such that at least one of said third holes aligns with a first 2-inch edge of a 2×8 whose second 2-inch edge engages said wood guide edge.

18. The saw guide of claim 17, wherein:

said saw guide is about ⅛-inch thick; and said 90-degree saw guide edge and and said wood guide edge are both about 10¼-inch long and said angled saw guide edge is about 14⅝ inch long.

19. The saw guide of claim 18, wherein said arms are about ⅛ inch thick.

20. The saw guide of claim 19, wherein said member is made from a material selected from the material group consisting of plastic, brass, aluminum, and an aluminum alloy.

21. The saw guide of claim 20, wherein said pencil guides are made of a material selected from the group plastic brass, aluminum, and an aluminum alloy.

* * * * *